United States Patent [19]
Hansen

[11] Patent Number: 5,996,412
[45] Date of Patent: *Dec. 7, 1999

[54] METHOD AND APPARATUS FOR MEASURING ACCELERATION OR MECHANICAL FORCES

[75] Inventor: Knud Styhr Hansen, Kokkedal, Denmark

[73] Assignee: A/S Bruel & Kjaer, Naerum, Denmark

[ * ] Notice: This patent is subject to a terminal disclaimer.

[21] Appl. No.: 09/051,655

[22] PCT Filed: Sep. 24, 1996

[86] PCT No.: PCT/DK96/00405

§ 371 Date: Jun. 8, 1998

§ 102(e) Date: Jun. 8, 1998

[87] PCT Pub. No.: WO97/14969

PCT Pub. Date: Apr. 24, 1997

[30] Foreign Application Priority Data

Oct. 13, 1995 [DK] Denmark .................................. 1159/95

[51] Int. Cl.⁶ ..................................................... G01P 15/08
[52] U.S. Cl. ............................................................. 73/514.34
[58] Field of Search ........................... 73/514.34, 514.36, 73/514.37, 862.043, 862.638, 862.639; 310/329, 333

[56] References Cited

U.S. PATENT DOCUMENTS

| | | | |
|---|---|---|---|
| 3,219,850 | 11/1965 | Langevin | 310/333 |
| 3,247,404 | 4/1966 | Batsch | 310/333 |
| 3,545,283 | 12/1970 | McGunigle | 73/514.34 |
| 3,583,677 | 6/1971 | Phillips | 310/333 |
| 3,584,243 | 6/1971 | Fabian | 310/333 |
| 3,858,065 | 12/1974 | Epstein | 310/329 |
| 4,802,371 | 2/1989 | Calderara et al. | 73/862.04 |
| 5,130,937 | 7/1992 | Kumar et al. | 364/565 |
| 5,422,532 | 6/1995 | Inoue et al. | 310/326 |
| 5,512,794 | 4/1996 | Kübler et al. | 310/329 |
| 5,677,487 | 10/1997 | Hansen | 73/514.34 |

FOREIGN PATENT DOCUMENTS 2 154 323 9/1985 United Kingdom .
2 224 598 5/1990 United Kingdom .

OTHER PUBLICATIONS

Patent Abstracts of Japan, vol. 95, No. 009 and JP 07–244069 (Tonkin Corp.), Sep. 19, 1995.

International Search Report for PCT/DK96/00405 (dated Feb. 13, 1997).

*Primary Examiner*—Hezron E. Williams
*Assistant Examiner*—Richard A. Moller
*Attorney, Agent, or Firm*—Fish & Richardson P.C.

[57] ABSTRACT

A method for measuring acceleration or mechanical forces, the acceleration causing inertial forces, uses a transducer or accelerometer in which at least one piezoelectric element is influenced by a shearing force substantially parallel to the polarization axis of the piezoelectric element, where the shearing force is created by a component of a mechanical or an inertial force substantially perpendicular to the polarization axis. A transducer for measuring acceleration or mechanical forces, the acceleration causing inertial forces, includes at least one piezoelectric element and at least two spaces surfaces abutting the piezoelectric element and arranged so that they are mutually displaced by a component of a mechanical or an inertial force acting substantially in a direction perpendicular to the polarization axis of the piezoelectric element. The piezoelectric element is preferably mounted between the free ends of two arms positioned on a supporting base, the arms being deformed or tilted in a direction perpendicular to their longitudinal axis by the force or acceleration. Forces or accelerations in three directions may be measured using a single piezoelectric element with a plurality of electrodes. The principles are also useful for the measurement of force or pressure.

18 Claims, 6 Drawing Sheets

METHOD AND APPARATUS FOR MEASURING ACCELERATION OR MECHANICAL FORCES

FIELD OF THE INVENTION

This invention relates to transducers employing piezoelectric elements for generating an electrical output in accordance with mechanical influences to which the piezoelectric element is subjected. The invention finds particular application in accelerometer transducers for giving electrical outputs in accordance with acceleration.

BACKGROUND OF THE INVENTION

Mechanical dynamometers are often used for static and dynamic measurements of mechanical forces. The forces to be measured may cause changes in the electrical charge, voltage, current or impedance in one or more measuring elements.

When measuring mechanical vibrations or acceleration it is known to use seismic accelerometers employing piezoelectric material for generating the electrical charges. For such accelerometers it is known to have a seismic mass arranged on the piezoelectric element or material which again is arranged on a base. Thus, when the accelerometer is subjected to acceleration, inertial forces introduce strains in the ceramic element which produces electrical outputs by virtue of the piezoelectric effect.

When vibrations having a frequency which is substantially lower than the natural resonant frequency of the total accelerometer system are acting upon the base, the seismic mass is forced to follow the vibrations thereby acting on the piezoelectric element with a force which is proportional to the seismic mass and the acceleration. Thereby, the inertial force acting on the piezoelectric element generates electrical charges on the element which charges are proportional to the acceleration.

When the piezoelectric element is subjected to compression forces during vibration, the accelerometer is of the compression type, and when the piezoelectric element is subjected to shear forces during vibration, the accelerometer is of the shear type. The compression type accelerometer is the most simple in its construction, but it is rather sensitive to temperature transients since the ceramic piezoelectric material is pyroelectric in the axis of polarization and the signals is taken from electrodes perpendicular to this axis. In contrast to this, the shear type accelerometer has a low sensitivity to temperature transients as the signal here is taken from electrodes parallel to the axis of polarisation.

It is known that a higher sensitivity can be obtained by an accelerometer of the "bender" type. In such an accelerometer, the force from the seismic mass acts to bend a so-called "bender element", which has a layer of an electric conductive material sandwiched between two layers of piezoelectric material being polarized in their direction of thickness. Thus, when the element is bent, then, in a plane perpendicular to the longitudinal axis of the element, stresses of compression are generated in one of the two layers and stresses of tension are generated in the remaining layer. When the length of the bender element is considerable larger than the thickness of the element, the electrical charges generated on each of the two layers will be larger than the charges obtained if the same seismic mass is operating directly for the purpose of compression or shear of the piezoelectric material.

However, a disadvantage of the bender element is that it is pyroelectric, since the electrodes are arranged on surfaces which are perpendicular to the axis of polarization.

Another disadvantage of the bender element is that the piezoelectric material constitutes a major part of the mechanical construction which causes some problems when trying to optimize this construction.

SUMMARY OF THE INVENTION

It is therefore a principal object of this invention to provide a method and a transducer in which the pyroelectric effects of the piezoelectric material are reduced or avoided. According to the principles of the present invention this is done by using the shear sensitivity of the piezoelectric material while at the same time having the force of the seismic mass amplified.

The principle of the present invention is illustrated in FIG. 1. In FIG. 1 two arms 1, 2 are shown both of which are secured in one end to a relatively stiff base 3 by two hinges 4, 5 and in the other end are secured to oppositely positioned surfaces of a piezoelectric element 6 which element is polarized in the longitudinal direction of the arms 1, 2.

When the system of FIG. 1 is influenced by a force P perpendicular to the longitudinal axis of the arms 1, 2 at a distance L from the axis of the hinges, a moment M=P×L is generated at the securing points. The hinges 4, 5 are only able to transfer shear or compression forces; thus, the moment M will not be transferred by the hinges, but the result will be a force couple $P_{f1}$, $P_{f2}$ with the arm h, where $P_{f1}$, $P_{f2}$ and the distance h fulfil the equation:

$$P \times L = P_{f1} \times h = P_{f2} \times h$$

or $$P_{f1} = P_{f2} = P \times L / h.$$

Thus, the force P perpendicular to the longitudinal axis of the arms is transformed to a force couple $P_{f1}$, $P_{f2}$ acting in the longitudinal direction of the arms. The forces $P_{f1}$, $P_{f2}$ are L/h times the force P and impose a mechanical stress on the piezoelectric element.

From the above discussion it should be understood that according to the principles of the present invention, it is possible, by arranging a seismic mass with its centre of gravity at a distance L from the axis of the hinges, to produce an accelerometer having a sensitivity which is L/h times larger than for an accelerometer where the same seismic mass is arranged to act directly on the piezoelectric element or elements, while at the same time obtaining the low dynamic temperature sensitivity which is characteristic for accelerometers of the shear type.

It is therefore a principal object of the invention to provide an improved method for measuring acceleration or mechanical forces, where the acceleration causes inertial forces, using a transducer or an accelerometer in which at least one piezoelectric element is influenced by a shearing force substantially parallel to the polarization axis of the piezoelectric element. In accordance with the principles of the invention this shearing force is created by a component of a mechanical or an inertial force being substantially perpendicular to the polarization axis of the piezoelectric element.

When a shearing force or forces acts or act on a piezoelectric element, electrical charges are created on surfaces of the element whereby an electrical voltage may be generated across said piezoelectric element. The charges or voltage may be used in order to determine the component of the mechanical force or the component of the acceleration resulting in the shearing force.

Preferably the shearing force is created by a mutual displacement of at least two spaced surfaces, with the displacement having a component substantially parallel to the axis of polarization of the piezoelectric element and being caused by the mechanical or inertial force. For the mechanical or inertial force component to create the shearing force it is preferred that the piezoelectric element or elements is or are mounted in an intermediate and abutting relationship with the surfaces.

It is preferred that the piezoelectric element or elements is or are mounted between and in shear relationship with a first and a second of two substantially oppositely positioned surfaces, and in a preferred embodiment, a first piezoelectric element and a second piezoelectric element are mounted between and in shear relationship with said first and second substantially oppositely positioned surfaces, respectively. However, more than two piezoelectric elements may be arranged between these surfaces. In order to obtain a good sensitivity to the forces acting on the piezoelectric elements, the polarization axes of the piezoelectric elements should be substantially parallel to each other. However, the polarisation axes may be opposed to each other.

In order for the two spaced surfaces to be mutually displaced by the mechanical or inertial force component and thereby creating the shearing force, it is preferred that each of the said two oppositely positioned surfaces are part of one of two arms or uprights positioned on a supporting base. The arms should be fastened to the base so that the arms are deformed or tilted in relation to the supporting base by said force component.

The form of the piezoelectric element or elements may vary, however, in order to maximize the sensitivity of the transducer, it is preferred that the piezoelectric element or elements has or have substantially parallel surfaces extending in the direction of the axis of polarization. Hence, when the piezoelectric element or elements is or are being influenced by said generated shearing force, electrical charges are generated on the surfaces of the piezoelectric element or elements. Thus, the generated charges or a corresponding generated voltage difference may represent a measure of the force component creating the shearing force. The substantially opposite parallel surfaces of the piezoelectric element or elements may be plane surfaces or cylindrical surfaces.

It should be understood that according to the principles of the invention it is possible to measure force components having different directions by having different directions of the surfaces of the piezoelectric element or elements.

Thus, in a preferred embodiment, a measure of a first mechanical or inertial force component substantially perpendicular to the polarization axis is obtained from first charges being developed on a first pair of parallel surfaces of the piezoelectric element or elements, and a measure of a second mechanical or inertial force component, which is substantially perpendicular to the polarization axis and substantially perpendicular to the direction of the first force component, is obtained from second charges being developed on a second pair of parallel surfaces of the piezoelectric element or elements.

Furthermore, a tri-axial measurement may be performed by further measuring a third mechanical or inertial force component substantially parallel to the polarization axis of the piezoelectric element or elements, with a shearing force being created by said third force component. It should be understood that a measurement in two directions may also be performed by combining the measurements of the first and the third force components.

Another object of the invention is to provide a transducer or an accelerometer which is able to measure a mechanical force or an acceleration according to the principles of the present invention. Thus, according to the invention, a transducer or an accelerometer is provided comprising at least one piezoelectric element and at least two spaced surfaces abutting said piezoelectric element. These surfaces are arranged so that they are mutually displaced when a component of a mechanical or an inertial force acts substantially in a direction perpendicular to the polarization axis of the piezoelectric element.

In order to obtain mechanical stress within the piezoelectric element or elements and thereby creating a shearing force, it is preferred that the piezoelectric element or elements of the transducer are positioned between and in shearing relationship with the two spaced surfaces. It is furthermore preferred that the two spaced surfaces are arranged so that they are substantially opposed to each other.

Thus, when the spaced surfaces are mutually displaced by the force component, the piezoelectric element or elements will be influenced by a shearing force substantially parallel to the polarization axis of the piezoelectric element or elements, thereby generating an electrical signal which may be output from the piezoelectric element or elements and used for determining the mechanical force component or the acceleration component.

It is preferred that the transducer has two ore more piezoelectric elements mounted between and in shear relationship with said two substantially oppositely positioned surfaces, where the piezoelectric elements have substantially parallel polarization axis. Furthermore it is preferred that the two spaced surfaces of the transducer are part of one or two arms or uprights positioned on a supporting base, the arms being deformed or tilted in relation to the supporting base when the force component is acting on at least one of the arms.

In order to obtain an electrical output signal when measuring a mechanical force or an acceleration, it is preferred that the transducer further comprises first electrical output means for outputting a first electrical output signal being developed across a first pair of substantially parallel surfaces of the piezoelectric element or elements, said first output signal representing a measure of a first mechanical or inertial force component substantially perpendicular to the polarization axis.

It is furthermore preferred that the transducer comprises second electrical output means for outputting a second electrical output signal being developed across a second pair of substantially parallel surfaces of the piezoelectric element or elements, said second output signal representing a measure of a second mechanical or inertial force component, which is substantially perpendicular to the polarization axis and substantially perpendicular to the direction of the first force component.

In order to obtain a tri-axial transducer it is also preferred that the transducer comprises third electrical output means for outputting a third electrical output signal being developed by a shearing force acting on the piezoelectric element or elements, said shearing force being generated by a third mechanical or inertial force component substantially parallel to the polarization axis of the piezoelectric element or elements.

It should be understood that the transducer or accelerometer according to the present invention may be constructed to incorporate any of the features presented in this specification and the accompanying drawings.

BRIEF DESCRIPTION OF THE DRAWINGS

Embodiments and details of the system appear from the claims and the detailed discussion of embodiments of the system given in connection with the accompanying drawings in which:

DETAILED DESCRIPTION OF THE INVENTION

Figure 1:
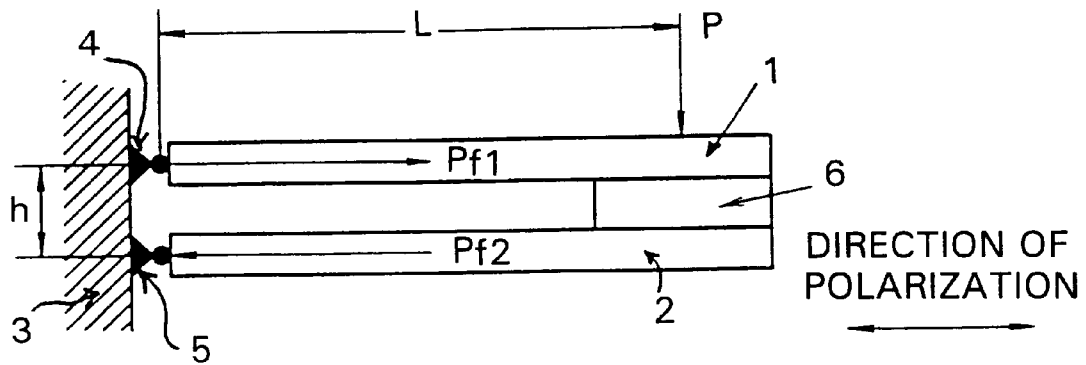
FIG. 1 is a schematic illustration of the principles of the invention.

In the example shown in FIG. 1, the arms 1, 2 are secured to the base 3 by use of hinges 4, 5 allowing the arms to be tilted in relation to the supporting base.

However, it should be understood that it is not necessary to secure the arms by use of hinges, but it is preferred that the attachment of the arms to the base is performed in such a way that deformation or tilting of the arms in relation to the base by a force perpendicular to the longitudinal axis of the arms is facilitated. Thus, it is preferred that each of the arms themselves is substantially more easily tilted in relation to the supporting base than the combination of the two arms and the piezoelectric element or elements.

Figure 2:
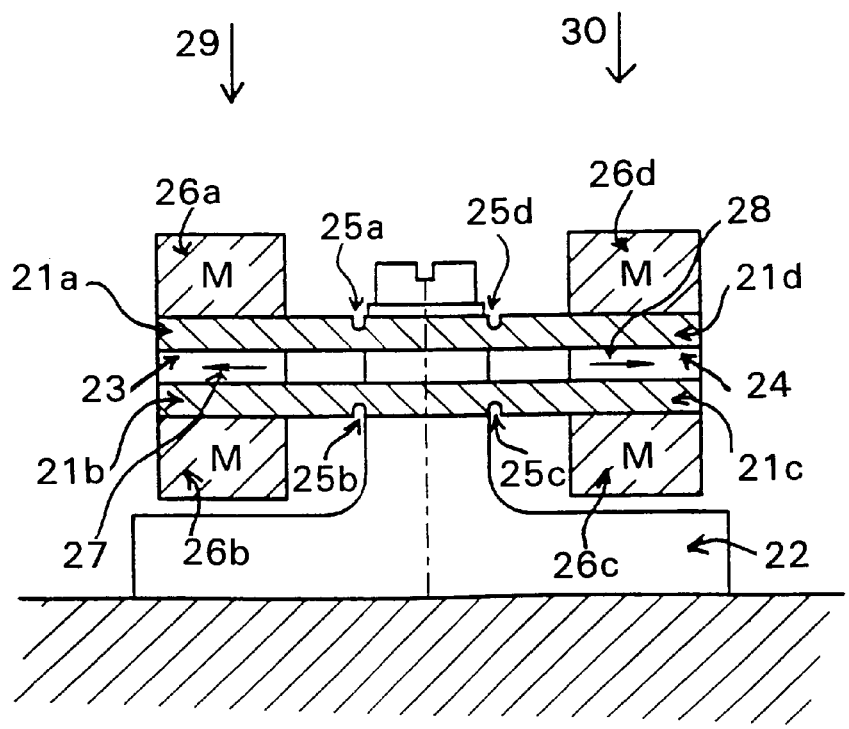
FIGS. 2 and 3 show embodiments of a symmetrical transducer according to the invention.
Figure 3:
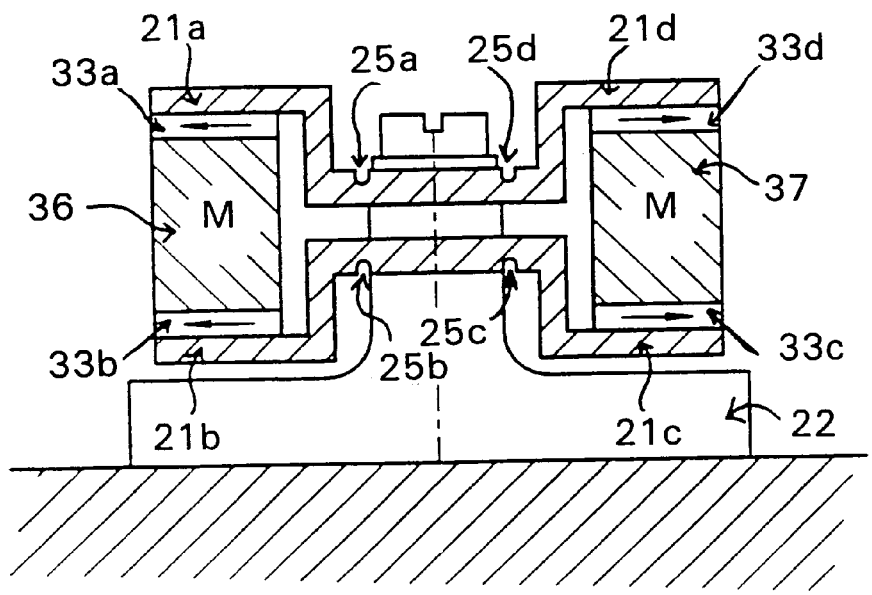

This is illustrated by the embodiments shown in FIGS. 2 and 3. FIG. 2 shows a symmetrical transducer having two pair of arms 21a, 21b and 21c, 21d secured to a base 22 where the tilting of the arms is facilitated by notches 25a, 25b and 25c, 25d. Between each pair of arms 21a, 21b and 21c, 21d, a piezoelectric element 23 and 24, respectively, is sandwiched, and a pair of seismic masses 26a, 26b and 26c, 26d is arranged on the outer surface of the arms 21a, 21b and 21c, 21d, respectively. The axes of polarization of the piezoelectric elements 23 and 24 are indicated by the arrows 27 and 28, respectively. In this embodiment of the invention, the construction of the transducer is symmetrical in order to obtain balance of the system and thereby reduce or avoid transverse movements in the transducer construction.

If the electrical signals from the two piezoelectric elements 23 and 24 are added, the transducer will mainly be sensitive to forces or accelerations in a direction given by the arrows 29 and 30, and if the signals from the two elements are subtracted, the transducer will mainly be sensitive to angular forces or angular accelerations around an axis perpendicular to the plane given by the arrows 27, 28, 29 and 30.

FIG. 3 shows another symmetrical transducer similar to the transducer of FIG. 2, but with the seismic masses 36, 37 sandwiched between corresponding pairs of piezoelectric elements 33a, 33b and 33c, 33d, respectively. The reference numerals of FIG. 3 are otherwise similar to the reference numerals of FIG. 2. If the seismic mass 36 equals the sum of the seismic masses 26a and 26b, the arm lengths from the notches 25a and 25b to the centre of gravity of the corresponding seismic mass or masses 36 or 26a and 26b are equal, and if the distances between the hinges which may be represented by the notches 25a and 25b in FIGS. 2 and 3 are equal, the shearing force acting on the piezoelectric element 23 in FIG. 2 will equal the shearing force acting on the piezoelectric elements 33a and 33b in FIG. 3.

Figure 4:
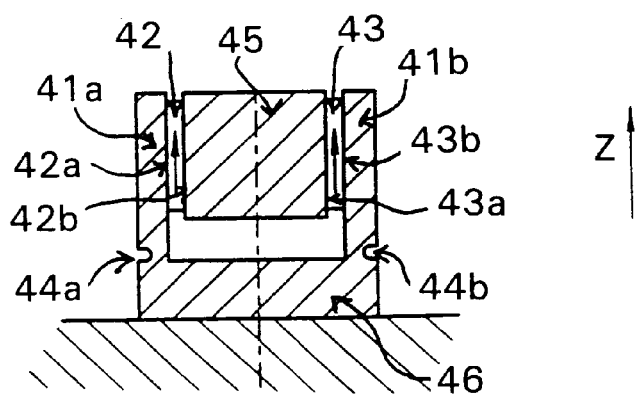
FIG. 4 shows an embodiment of a transducer with two piezoelectric elements in accordance with the invention.

FIG. 4 shows a transducer corresponding to one half of the transducer shown in FIG. 3, but turned 90° so that the axis of polarization of the piezoelectric elements is in the direction of the z-axis of the system of co-ordinates. In FIG. 4 the two arms are referred to by 41a and 41b, the two piezoelectric elements are referred to by 42 and 43 with surfaces 42a, 42b and 43a, 43b, respectively, the two notches are referred to by 44a and 44b, the seismic mass is referred to by 45, and the base is referred to by 46.

It is preferred that the surfaces 42b and 43a are in conducting engagement with the seismic mass 45 which should be made from a conductive material with the result that the potential of surface 42b equals the potential of surface 43a. When measuring an acceleration in the z-direction in accordance with prior art technique the two piezoelectric elements act in parallel with the substantial same potential difference being generated from surface 42a to surface 42b and from surface 43b to surface 43a. This voltage can be obtained by grounding the surfaces 42a and 43b and by measuring the voltage of the seismic mass 45.

However, accelerations in the x-direction may be measured according to the principles of the present invention by having the two piezoelectric elements 42 and 43 in series. Having the same potential for the surfaces 42b and 43a, the surface 42a may be grounded and the electrical series output may be output from the surface 43b. It should be noted that the electrical output signal may represent the electrical charges generated at the surface 43b.

Thus, with the arrangement of a transducer as shown in FIG. 4 it is possible to bring output signals to a combined summation and difference amplifier and thereby measure acceleration in two directions which are perpendicular to each other.

If the direction of polarization of the piezoelectric element 43 is turned substantially 180°, the output signals from the elements 42 and 43 should preferably be combined in parallel when measuring accelerations in the x-direction and in series when measuring accelerations in the z-direction.

If it is desired to measure accelerations or forces in all three axes of the system of co-ordinates, this can be accomplished by having a second pair of piezoelectric elements arranged on the seismic mass 45. This is illustrated in FIG. 5 which shows a tri-axial accelerometer where the principles of the present invention is used when measuring in the x-direction and the y-direction, whereas the acceleration in the z-direction is measured in accordance with prior art techniques.

Figure 5:
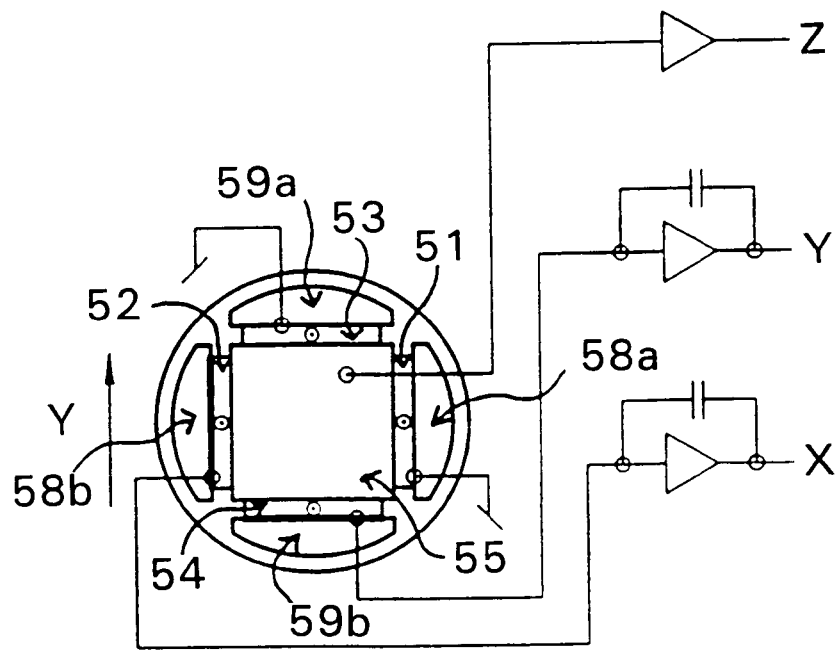
FIG. 5 shows an embodiment of a transducer with four piezoelectric elements in accordance with the invention.
Figure 5:
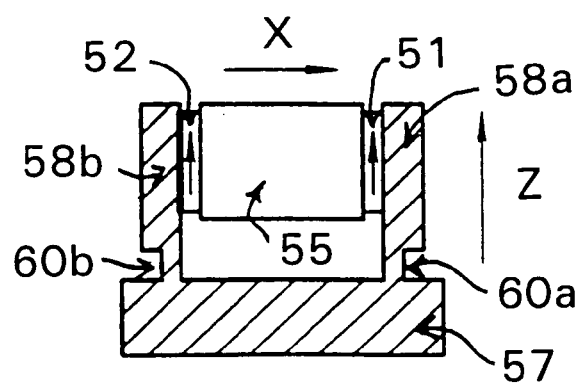

The transducer of FIG. 5 comprises piezoelectric elements 51, 52, 53 and 54 which are all polarized in the z-direction of the transducer or accelerometer. All four elements 51, 52, 53 and 54 have their inner surfaces in conducting engagement with a seismic mass 55, which is preferably made of a conducting material, whereas their outer surfaces are abutting four corresponding arms 58a, 58b and 59a, 59b. The elements may be clamped between the arms and the seismic mass by a clamping ring surrounding the arms. The arms are arranged on a base 57, and it is preferred that the arms have notches 60a, 60b and 61a, 61b (61a and 61b are not shown) in order to facilitate tilting when measuring accelerations or forces in the x-direction or the y-direction.

It is preferred that the outer surface of element 51 is connected to ground, and that the two elements 51 and 52 are connected in series in order to feed a signal to an x-output for measuring accelerations or forces in the x-direction. Correspondingly, it is preferred that the outer surface of element 53 is connected to ground, and that the two elements 53 and 54 are connected in series in order to feed a signal to an y-output for measuring accelerations or forces in the y-direction. Both the x-signal and the y-signal may be connected to charge amplifiers delivering the x-output and the y-output, respectively.

When the transducer in FIG. 5 is vibrated in the z-direction, the signals of all four elements 51–54 are summed at the seismic mass 55, since the input at the charge amplifiers of the x-output and the y-output are virtually zero. Thus, when measuring forces or accelerations in the z-direction, the signals from all four elements 51–54 are used in parallel and an output signal for measurements in the z-direction is taken from the seismic mass 55 and fed to a voltage amplifier in order to obtain a z-output.

When vibrating the transducer in the x-direction or the y-direction the corresponding pair of elements are connected in series. Each element in such a pair of series connected elements has the substantially same capacity and the same resulting charges, and if the first element in such a pair is connected to ground and the second element is connected to virtually zero at the charge amplifier, the centre of such a pair will also have a voltage of zero. Thus, no or only a small error signal will be generated in the non-vibrating directions, even if all the elements 51–54 are electrically connected to each other at the centre point, which may be represented by the seismic mass 55.

It is important to notice that the output signal feeding the z-output is not capacitively loaded, since a vibration in the z-direction otherwise could result in a current being drawn from the centre point to ground. Thus, the voltage amplifier at the z-output should preferably be an amplifier with a low input capacity.

Figure 6:
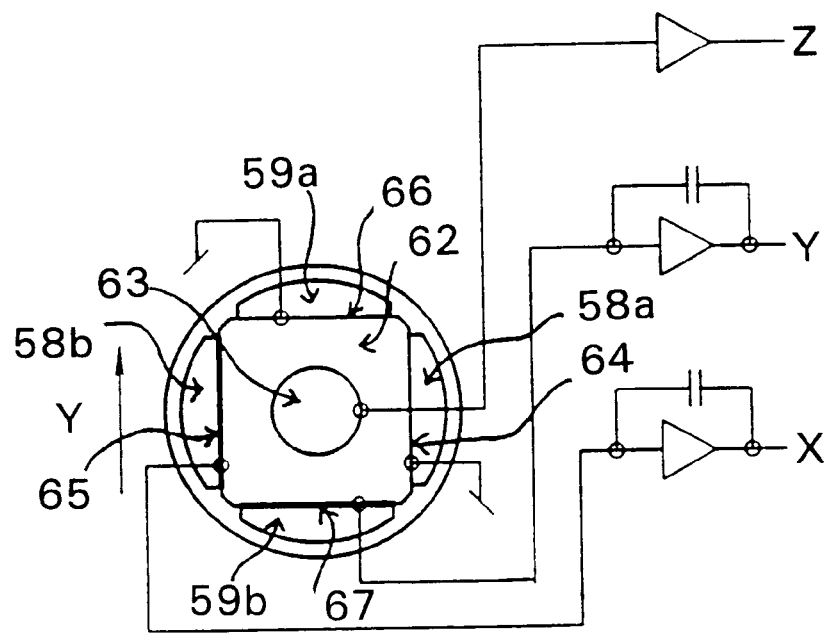
FIG. 6 shows an embodiment of a transducer in accordance with the invention in which the piezoelectric element is formed as a block with a cylindrical hole.
Figure 6:
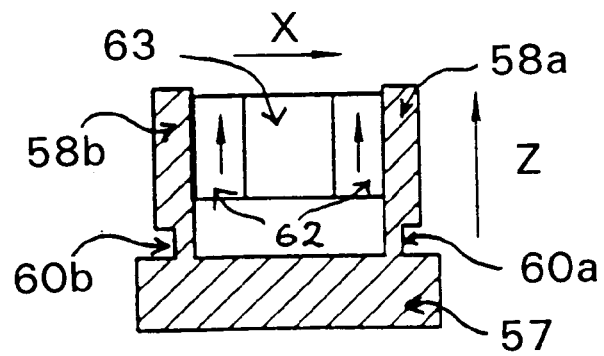

FIG. 6 shows a tri-axial transducer or accelerometer measuring along the same principles discussed in connection with FIG. 5. However, in FIG. 6 the four elements 51–54 of FIG. 5 are replaced by one piezoelectric element formed mainly as a block 62 having a substantially cylindrical hole 63. The outer surfaces 64–67 of the block 62 correspond to the outer surfaces of the elements 51–54 in FIG. 5. The reference numerals in FIG. 6 are otherwise similar to the reference numerals of FIG. 5.

There is no separate seismic mass in the transducer of FIG. 6, since the weight of the block 62 will operate as a seismic mass when measuring in the z-direction. Furthermore, when measuring in the x-direction and the y-direction the masses of the arms and the clamping ring will also contribute to the total seismic mass. However, a separate seismic mass may be introduced into the hole 63 in order to obtain a greater sensitivity of the transducer.

Figure 7:
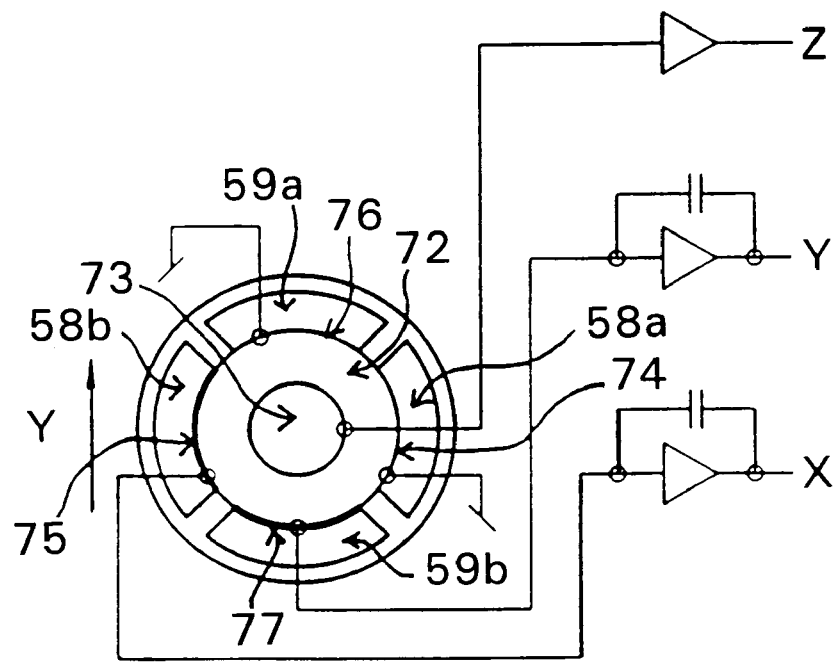
FIG. 7 shows an embodiment of a transducer in accordance with the invention having an annular piezoelectric element.
Figure 7:
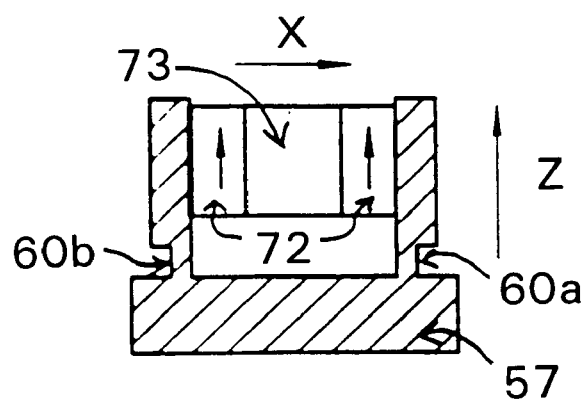

Another example of a tri-axial transducer or accelerometer is shown in FIG. 7. This transducer corresponds to the transducer of FIG. 6, however, the piezoelectric block 62 is now replaced with a piezoelectric element 72 having a substantially annular cross section with a hole 73. The surfaces 74, 75, 76 and 77 abutting the arms 58a, 58b and 59a, 59b which are formed to engage with these surfaces, correspond to the surfaces 64–67 in FIG. 6. It should be understood that the transducer of FIG. 7 will operate in a way corresponding to the transducer of FIG. 6, but the annular construction may be produced at lower costs.

Figure 8:
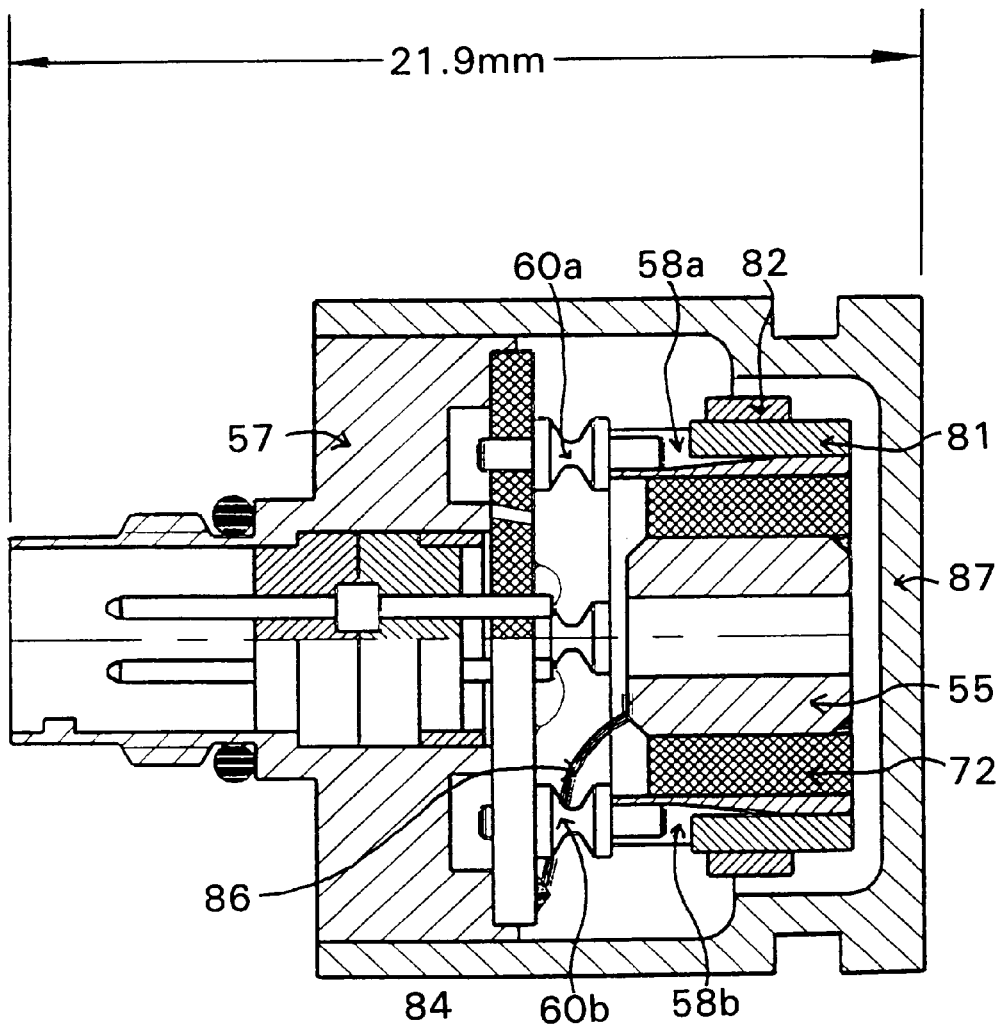
FIG. 8 shows a presently preferred embodiment of a transducer in accordance with the invention having an annular piezoelectric element.

FIG. 8 shows a presently preferred embodiment of a tri-axial transducer or accelerometer operating according to the principles discussed in connection with FIG. 5. A piezoelectric ring 72 is polarized in the axial direction, and a cylindrical seismic mass 55 made of tungsten is soldered into the piezoelectric ring 72. Four arms 58a, 58b, 59a, and 59b (59a and 59b are not shown) are positioned adjacent to the piezoelectric ring 72, and an insulating ring 81 insulates the four arms 58a, 58b, 59a, and 59b from a clamping ring 82 of steel pressing the four arms firmly against the piezoelectric ring 72. Each of the four arms 58a, 58b, 59a, and 59b is supported by a corresponding hinge 60a, 60b, 61a, and 61b (61a and 61b are not shown) that electrically and mechanically interconnects the corresponding arm to a thickfilm circuit board 84 containing three amplifiers. The thickfilm circuit board 84 is glued into a base 57, which is made of titanium and comprises an integrated electrical connector. A wire 86 connects the cylindrical seismic mass 55 to the amplifier for the z-direction. The housing 87 of the transducer is made of titanium, and is externally shaped as a cube. The housing 87 has a cylindrical bore, into which the base 57 is pressed and welded to the housing.

The accelerometer shown in FIG. 8 has the following specifications:

| | | |
|---|---|---|
| Sensitivity before amplifier (X and Y directions): | 9 | pC/g |
| Sensitivity before amplifier (Z direction): | 10 | mV/g |
| Resonance frequency (X and Y directions): | 8 | kHz |
| Resonance frequency (Z direction): | 10 | kHz |
| Weight: | 15 | gram |

Although only a limited number of embodiments of the invention has been specifically disclosed and described herein, it will be obvious that the invention is not limited thereto, but is capable of being embodied in other forms as well. Furthermore, the invention is not limited to the measurements of acceleration, but may for example be employed in instruments that measure force or pressure.

I claim:

1. A transducer for measuring acceleration or mechanical forces with said acceleration causing inertial forces, said transducer comprising:
   at least one piezoelectric element having a polarization axis,
   a supporting base,
   two arms or uprights placed on the supporting base, the two arms or uprights being deformable or tiltable in relation to the supporting base by a component of a mechanical or an inertial force acting substantially in a direction perpendicular to the polarization axis of said at least one piezoelectric element, and
   at least two spaced surfaces, the at least one piezoelectric element being mounted in between the at least two spaced surfaces, each of said at least two spaced surfaces being part of one of the two arms or uprights, and the at least two spaced surfaces being arranged so that they are mutually displaceable by said force component to create a shearing force in the at least one piezoelectric element in a direction substantially parallel with its polarization axis, wherein,
   each arm or upright of the two arms or uprights comprises a region of relatively reduced thickness acting as a hinge means and being located adjacent to the supporting base.

2. A transducer according to claim 1, wherein the at least two spaced surfaces are arranged so that they are substantially opposed to each other.

3. A transducer according to claim 2, wherein two or more piezoelectric elements of the at least one piezoelectric element are mounted in between substantially opposed surfaces of said at least two spaced surfaces, said two or more piezoelectric elements having substantially parallel polarization axes.

4. A transducer according to claim 1, wherein the at least one piezoelectric element has substantially parallel surfaces extending in the direction of the axis of polarization of the at least one piezoelectric element, and wherein electrical charges are developed on said substantially parallel surfaces, when the shearing force is created in the at least one piezoelectric element by displacement of said two arms or uprights said charges representing a measure of said force component creating the shearing force by mutually displacing said at least two spaced surfaces.

5. A transducer according to claim 4, wherein the substantially parallel surfaces of the at least one piezoelectric element are opposite plane surfaces.

6. A transducer according to claim 5, wherein the substantially parallel surfaces of the at least one piezoelectric element are opposite cylindrical surfaces.

7. A transducer according to claim 6, further comprising
a first pair of substantially parallel surfaces of the at least one piezoelectric element, and
first electrical output means for outputting a first electrical output signal being developed across said first pair of substantially parallel surfaces of the at least one piezoelectric element;
said first output signal representing a measure of a first mechanical or inertial force component substantially perpendicular to the polarization axis of the at least one piezoelectric element.

8. A transducer according to claim 7, further comprising
a second pair of substantially parallel surfaces of the at least one piezoelectric element, and
second electrical output means for outputting a second electrical output signal being developed across said second pair of substantially parallel surfaces of the at least one piezoelectric element,
said second output signal representing a measure of a second mechanical or inertial force component, which is substantially perpendicular to the polarization axis and substantially perpendicular to the direction of the first force component.

9. A transducer according to claim 8, further comprising
third electrical output means for outputting a third electrical output signal being developed by a shearing force acting on the at least one piezoelectric element, said shearing force being generated by a third mechanical or inertial force component substantially parallel to the polarization axis of the at least one piezoelectric element.

10. A transducer according to claim 1, wherein each of the two arms or uprights themselves are more easily tilted in relation to the supporting base than the combination of the two arms or uprights and the at least one piezoelectric element.

11. A method for measuring acceleration or mechanical forces, said acceleration causing inertial forces,
said method comprising:
providing a transducer comprising: at least one piezoelectric element having a polarization axis; a supporting base; two arms or uprights placed on the supporting base, the two arms or uprights being deformable or tiltable in relation to the supporting base by a component of a mechanical or an inertial force acting substantially in a direction perpendicular to the polarization axis of the at least one piezoelectric element; each arm or upright of the two arms or uprights comprising a region of relatively reduced thickness acting as a hinge means and being located adjacent to the supporting base; and at least two spaced surfaces, the at least one piezoelectric element being mounted in between the at least two spaced surfaces, each of the at least two spaced surfaces being part of one of the two arms or uprights, and the at least two spaced surfaces being arranged so that they are mutually displaceable by the force component;
providing inertial forces or mechanical forces, said inertial forces being caused by acceleration, said forces having a first component being substantially perpendicular to the polarization axis of the at least one piezoelectric element;
deforming or tilting the two arms or uprights in relation to the supporting base so as to mutually displace the at least two spaced surfaces and so as to create, in the at least one piezoelectric element, a shearing force substantially parallel to its polarization axis; and
outputting a first electrical signal across a first pair of substantially parallel surfaces of the at least one piezoelectric element, said first output signal representing a measure of said first mechanical or inertial force component.

12. A method according to claim 11, wherein a first piezoelectric element and a second piezoelectric element of the at least one piezoelectric element are mounted in between a first and a second of two substantially oppositely positioned and spaced surfaces, respectively, of the at least two spaced surfaces, said first and second piezoelectric elements having substantially parallel polarization axes.

13. A method according to claim 11, wherein two or more piezoelectric elements of the at least one piezoelectric element are mounted in between a first and a second of two substantially oppositely positioned and spaced surfaces of the at least two spaced surfaces, said two or more piezoelectric elements having substantially parallel polarization axes.

14. A method according to claim 11, wherein the at least two spaced surfaces are parallel and extend in the direction of the axis of the polarization, and wherein the deforming or tilting step comprises developing electrical charges on the at least two spaced surfaces, said charges representing a measure of the force component creating the shearing force.

15. A method according to claim 14, wherein the first pair of substantially parallel surfaces of the at least one piezoelectric element are plane surfaces.

16. A method according to claim 14, wherein the first pair of substantially parallel surfaces of the at least one piezoelectric element are cylindrical surfaces.

17. A method according to claim 14, wherein the provided mechanical or inertial force has a second mechanical or inertial force component, which is substantially perpendicular to the polarization axis of the at least one piezoelectric element and substantially perpendicular to the direction of the first force component, the method comprising the step of obtaining a measure of said second mechanical or inertial force component from second charges developed on a second pair of parallel surfaces of the at least one piezoelectric element.

18. A method according to claim 17, further comprising measuring a third mechanical or inertial force component substantially parallel to the polarization axis of the piezoelectric element or elements, with a shearing force being created by said third force component.

* * * * *